(12) United States Patent
Kondo (10) Patent No.: US 7,881,193 B2
(45) Date of Patent: Feb. 1, 2011

(54) NETWORK SYSTEM

(75) Inventor: Masahiro Kondo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 233 days.

(21) Appl. No.: 12/222,925

(22) Filed: Aug. 20, 2008

(65) Prior Publication Data

US 2009/0092145 A1    Apr. 9, 2009

(30) Foreign Application Priority Data

Oct. 9, 2007    (JP) ............................ 2007-263168

(51) Int. Cl.
*G01R 31/08*    (2006.01)
(52) U.S. Cl. ..................... 370/230; 370/235; 709/220
(58) Field of Classification Search ................. 370/229, 370/230, 230.1, 235, 248, 252, 282, 360, 370/386, 389, 390, 392, 401, 445, 463; 709/220, 709/224
See application file for complete search history.

(56) References Cited

U.S. PATENT DOCUMENTS

| 5,907,553 | A | * | 5/1999 | Kelly et al. ................. 370/433 |
| 6,101,012 | A | * | 8/2000 | Danagher et al. ............. 398/1 |
| 6,169,729 | B1 | * | 1/2001 | Feuerstraeter ............... 370/296 |
| 6,584,109 | B1 | * | 6/2003 | Feuerstraeter et al. ....... 370/401 |
| 2006/0250947 | A1 | * | 11/2006 | Allen ......................... 370/216 |
| 2007/0166035 | A1 | * | 7/2007 | Aoki ........................... 398/51 |

OTHER PUBLICATIONS

IEEE 802.3-2005, "Local and metropolitan area networks—Part 3:CSMA/CD access method and physical layer specifications", 2005, pp. 1-620.*

* cited by examiner

*Primary Examiner*—Jayanti K Patel
*Assistant Examiner*—Jung Park
(74) *Attorney, Agent, or Firm*—Rabin & Berdo, P.C.

(57) ABSTRACT

A network system includes a switch device and a plurality of communication terminals. The switch device has a plurality of ports. The switch device receives a packet at its one port and transmits the packet from another port corresponding to the packet's destination. The communication terminals are connected to the ports of the switch device respectively to transmit and receive packets. The terminal transmits a connection request including connection destination information to the switch device and performs communication using unused signal lines when a "connection possible" notification is received from the switch device. Upon receiving the connection request, the switch device determines if connection to a port corresponding to the connection destination information is possible. If connection is possible, the switch device transmits a "connection possible" notification to the connection-request-making terminal and connects an unused signal line of the port connected to the terminal to a signal line of the port corresponding to the connection destination.

7 Claims, 9 Drawing Sheets

| PIN # | PORT | | PHYSICAL LAYER PROCESSOR | | PHYSICAL SWITCH UNIT | |
|---|---|---|---|---|---|---|
| | SYMBOL | MEANING | SYMBOL | MEANING | SYMBOL | MEANING |
| 1 | DAT0+ | TRANSMIT 0+ | DAT0+ | TRANSMIT 0+ | — | — |
| 2 | DAT0- | TRANSMIT 0- | DAT0- | TRANSMIT 0- | — | — |
| 3 | DAT1+ | TRANSMIT 1+ | DAT1+ | TRANSMIT 1+ | — | — |
| 4 | DAT2+ | TRANSMIT 2+ | DAT2+ | TRANSMIT 2+ | UNCONNECTED | UNUSED |
| 5 | DAT2- | TRANSMIT 2- | DAT2- | TRANSMIT 2- | UNCONNECTED | UNUSED |
| 6 | DAT1- | TRANSMIT 1- | DAT1- | TRANSMIT 1- | — | — |
| 7 | DAT3+ | TRANSMIT 3+ | DAT3+ | TRANSMIT 3+ | UNCONNECTED | UNUSED |
| 8 | DAT3- | TRANSMIT 3- | DAT3- | TRANSMIT 3- | UNCONNECTED | UNUSED |

FIG. 4

| PIN # | PORT | | PHYSICAL LAYER PROCESSOR | | PHYSICAL SWITCH UNIT | |
|---|---|---|---|---|---|---|
| | SYMBOL | MEANING | SYMBOL | MEANING | SYMBOL | MEANING |
| 1 | TX+ | TRANSMIT + | TX+ | TRANSMIT + | — | — |
| 2 | TX- | TRANSMIT - | TX- | TRANSMIT - | — | — |
| 3 | RX+ | RECEIVE + | RX+ | RECEIVE + | — | — |
| 4 | TX2+ | TRANSMIT 2+ | UNCONNECTED | UNUSED | TX2+ | TRANSMIT 2+ |
| 5 | TX2- | TRANSMIT 2- | UNCONNECTED | UNUSED | TX2- | TRANSMIT 2- |
| 6 | RX- | RECEIVE - | RX- | RECEIVE - | — | — |
| 7 | RX2+ | RECEIVE 2+ | UNCONNECTED | UNUSED | RX2+ | RECEIVE 2+ |
| 8 | RX2- | RECEIVE 2- | UNCONNECTED | UNUSED | RX2- | RECEIVE 2- |

| PORT 25 | | PHYSICAL LAYER PROCESSOR 23a | | PHYSICAL LAYER PROCESSOR 23b | |
|---|---|---|---|---|---|
| PIN # | SYMBOL | MEANING | SYMBOL | MEANING | SYMBOL | MEANING |
| 1 | DAT0+ | TRANSMIT 0+ | DAT0+ | TRANSMIT 0+ | — | — |
| 2 | DAT0- | TRANSMIT 0- | DAT0- | TRANSMIT 0- | — | — |
| 3 | DAT1+ | TRANSMIT 1+ | DAT1+ | TRANSMIT 1+ | — | — |
| 4 | DAT2+ | TRANSMIT 2+ | DAT2+ | TRANSMIT 2+ | UNCONNECTED | UNUSED |
| 5 | DAT2- | TRANSMIT 2- | DAT2- | TRANSMIT 2- | UNCONNECTED | UNUSED |
| 6 | DAT1- | TRANSMIT 1- | DAT1- | TRANSMIT 1- | — | — |
| 7 | DAT3+ | TRANSMIT 3+ | DAT3+ | TRANSMIT 3+ | UNCONNECTED | UNUSED |
| 8 | DAT3- | TRANSMIT 3- | DAT3- | TRANSMIT 3- | UNCONNECTED | UNUSED |

*Note: PIN # column shown with SYMBOL and MEANING under PORT 25.*

FIG. 8

| PIN # | PORT 25 SYMBOL | PORT 25 MEANING | PHYSICAL LAYER PROCESSOR 23a SYMBOL | PHYSICAL LAYER PROCESSOR 23a MEANING | PHYSICAL LAYER PROCESSOR 23b SYMBOL | PHYSICAL LAYER PROCESSOR 23b MEANING |
|---|---|---|---|---|---|---|
| 1 | TX+ | TRANSMIT + | TX+ | TRANSMIT + | — | — |
| 2 | TX- | TRANSMIT - | TX- | TRANSMIT - | — | — |
| 3 | RX+ | RECEIVE + | RX+ | RECEIVE + | — | — |
| 4 | TX2+ | TRANSMIT 2+ | UNCONNECTED | UNUSED | TX2+ | TRANSMIT 2+ |
| 5 | TX2- | TRANSMIT 2- | UNCONNECTED | UNUSED | TX2- | TRANSMIT 2- |
| 6 | RX- | RECEIVE - | RX- | RECEIVE - | — | — |
| 7 | RX2+ | RECEIVE 2+ | UNCONNECTED | UNUSED | RX2+ | RECEIVE 2+ |
| 8 | RX2- | RECEIVE 2- | UNCONNECTED | UNUSED | RX2- | RECEIVE 2- |

NETWORK SYSTEM

BACKGROUND OF THE INVENTION

1. Field of the Invention

The present invention relates to a network system including a switch device and a plurality of communication terminals. The switch device receives a packet at one port thereof and transmits the packet from another port corresponding to a destination of the packet. The communication terminals are connected to the ports of the switch device respectively to transmit and receive packets between the communication terminals through the switch device.

2. Description of the Related Art

A network system such as a LAN includes a switch device which has a plurality of ports and a plurality of communication terminals which are connected to the ports of the switch device. For example, the network system may use a switch device including a plurality of ports based on IEEE802.3. Such a switch device complies with 10Base-T, 100Base-TX, 1000Base-T, or the like specified in IEEE802.3 (for example, see "IEEE Std 802.3-2005, IEEE Standard for Information technology-Telecommunications and information exchange between systems-Local and metropolitan area networks-Specific requirements, Part 3: CSMA/CD Access Method and Physical Layer Specifications," The Institute of Electrical and Electronics Engineers, Incorporated, 2005).

When a communication terminal is connected to a port of the switch device, the switch device determines a communication speed, a communication direction (full or half duplex), and the like for communication with the connected communication terminal through auto-negotiation or the like as specified in IEEE802.3. Then, the switch device transmits or receives the packet to and from the connected communication terminal. When a packet has been received from the communication terminal, the switch device temporarily stores the packet in a buffer unit or the like. The switch device then determines a port, from which the packet is to be transmitted, from an IP address or the like of a destination written in the packet stored in the buffer unit and then transmits the packet from the determined port.

In the switch device used in the above-described network system, a packet received from a communication terminal is temporarily stored in the buffer unit, a port from which the packet is to be transmitted is decided from an IP address or the like of the destination of the packet, and the packet is then transmitted from the decided port. If the number (or amount) of packets received at the ports of the switch device increases, a bandwidth required to transmit the packets from the ports to the buffer unit increases. If the bandwidth required to transmit packets from the port to the buffer unit increases, the required bandwidth may exceed the transmission capabilities of the switch device. If the bandwidth required to transmit packets exceeds the transmission capabilities of the switch device, packets received from the communication terminal may be lost since no bandwidth guarantee is provided in the switch device.

SUMMARY OF THE INVENTION

One object of the present invention is to provide a network system which can prevent packet loss at a switch device even when a volume of packets transmitted from communication terminals to the switch device is large.

According to one aspect of the present invention, there is provided an improved network system including a switch device and a plurality of terminal devices. The switch device has a plurality of ports. The ports are connected to the terminal devices, respectively. Each port is connected to a corresponding terminal device through a signal line group. Each signal line group has a plurality of signal lines. When one of the terminal devices intends to send a packet to another terminal device, the terminal device first sends the packet to the switch device. The switch device receives the packet at one port thereof and transmits the packet from another port corresponding to a destination of the packet. Each communication terminal has a connection request unit that sends a connection request carrying connection destination information to the switch device. Each communication terminal also has an unused signal line communication unit that performs communication using a signal line that is not being used for packet transmission when a "connection possible" notification is received from the switch device. The switch device also includes a connection determination unit that determines, when the connection request is received, whether or not connection to a port corresponding to the connection destination information is possible. The switch device also includes a connection possibility notifier that transmits, when it is determined by the connection determination unit that the connection is possible, a "connection possible" notification to the connection-request-making communication terminal. The switch device also includes an unused signal line connector that connects, when it is determined by the connection determination unit that the connection is possible, a signal line, which is not being used for packet transmission among signal lines of a port connected to the connection-request-making communication terminal, to a signal line of the port corresponding to the connection destination.

BRIEF DESCRIPTION OF THE DRAWINGS

The above-described and other objects, aspects and advantages of the present invention will be more clearly understood from the following detailed description taken in conjunction with the accompanying drawings, in which.

DETAILED DESCRIPTION OF THE INVENTION

The preferred embodiments of the invention will now be described in detail with reference to the accompanying drawings.

Figure 1:
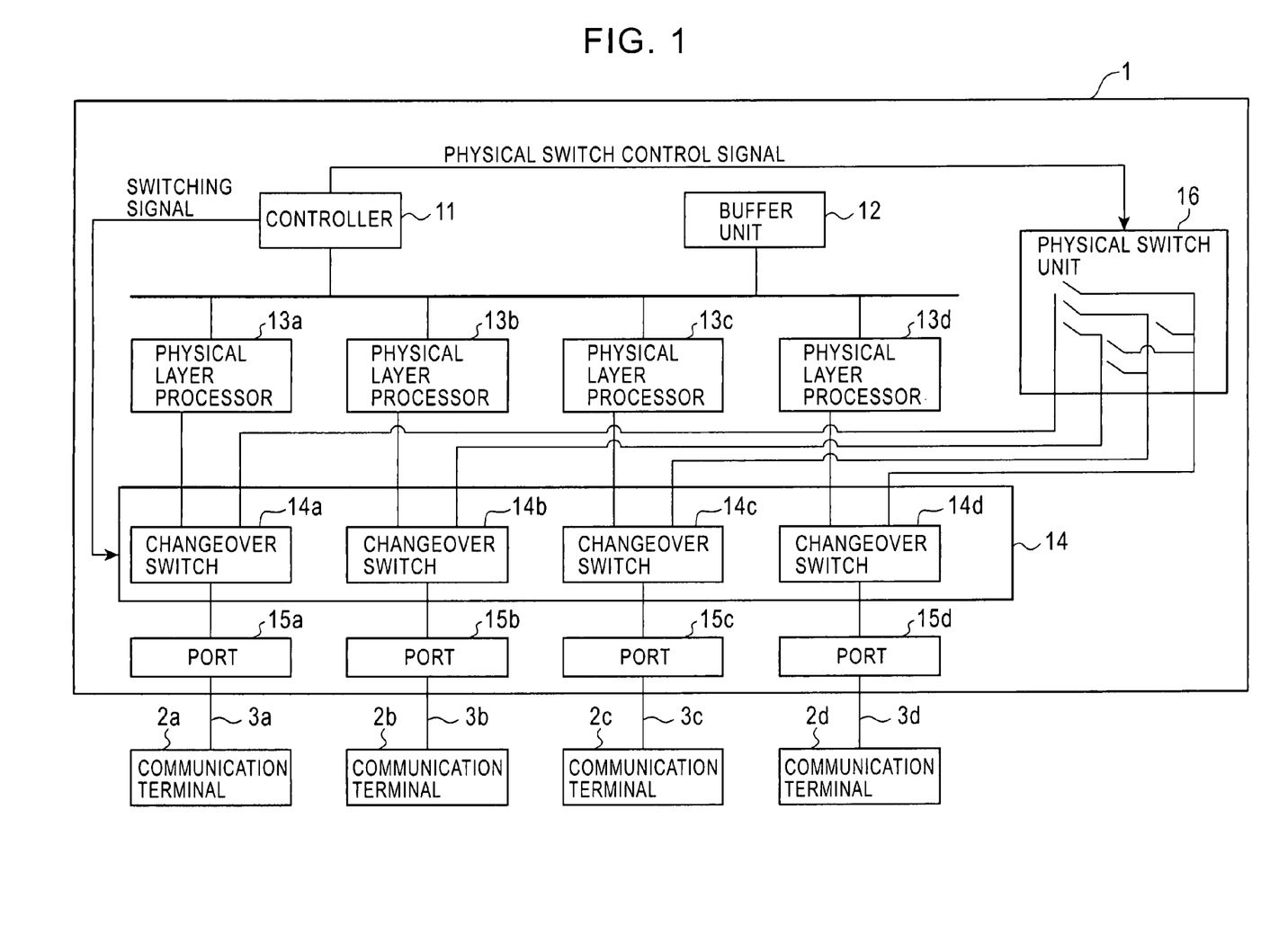
FIG. 1 is a block diagram of a network system according to an embodiment of the invention.

Referring to FIG. 1, a configuration of a network system according to one embodiment will be described. The network system includes a single switch device 1 and four communication terminals 2a to 2d. The switch device 1 has four ports 15a to 15d. The communication terminals 2a, to 2d transmit and receive packets between themselves through the switch device 1. The communication terminal 2a is connected to the port 15a of the switch device 1 through a transmission cable 3a. The communication terminal 2b is connected to the port 15b of the switch device 1 through a transmission cable 3b. The communication terminal 2c is connected to the port 15c of the switch device 1 through a transmission cable 3c. The communication terminal 2d is connected to the port 15d of the switch device 1 through a transmission cable 3d. The switch device 1 also includes a controller 11, a buffer unit 12, physical layer processors 13a to 13d, a switching unit 14, and a physical switch unit 16.

The switch device 1 temporarily stores a packet received at the port 15a (or 15b or 15c or 15d) in the buffer unit 12, determines a port, to which the packet is to be transmitted, based on a destination IP address of the packet, and transmits the packet through the determined port. Here, either a port that is connected to a communication terminal having the destination IP address of the packet or a port that is connected to the communication terminal having the destination IP address of the packet via another device may be selected as the port to which the packet is to be transmitted. In response to a connection request from the communication terminal 2a (or 2b or 2c or 2d), the switch device 1 connects a signal line, which is not being used for packet transmission among signal lines of a port connected to the connection-request-making communication terminal, to one of signal lines of a port corresponding to connection destination information included in the connection request. For example, an IP address of a communication terminal, which is a connection destination, is written in the connection destination information. The switch device 1 selects, as the port corresponding to the connection destination information, a port that is connected to a communication terminal having the same IP address as the IP address written in the connection destination information or a port that is connected to the communication terminal having the same IP address via another device.

The controller 11 controls the switch device 1. The controller 11 receives information about a communication speed, a communication direction (full or half duplex), and the like determined by auto-negotiation from the physical layer processors 13a to 13d and controls the communication speed, communication direction, and the like of the switch device 1. The controller 11 also performs packet transmission between the ports 15a to 15d and the buffer unit 12. The controller 11 transmits a switching signal to control the switching unit 14 or transmits a physical switch control signal to control the physical switch unit 16. The buffer unit 12 temporarily stores packets received through the ports 15a to 15d. Each of the physical layer processors 13a to 13d provides 10Base-T, 100Base-TX, and 1000Base-T interfaces and performs physical layer processing. Each of the physical layer processors 13a to 13d transmits the information about the communication speed, communication direction, and the like determined by auto-negotiation to the controller 11. The switching unit 14 includes changeover switches 14a to 14d which are controlled by switching signals supplied from the controller 11. Each of the ports 15a to 15d is a connector that receives eight signal lines. The ports 15a to 15d are connected to the communication terminals 2a to 2d through the transmission cables 3a to 3d, respectively. Each transmission cable 3a, 3b, 3c, 3d has eight signal lines. The physical switch unit 16 controls on/off of the switches which connect specified ports on the basis of a physical switch control signal sent from the controller 11.

Figure 2:
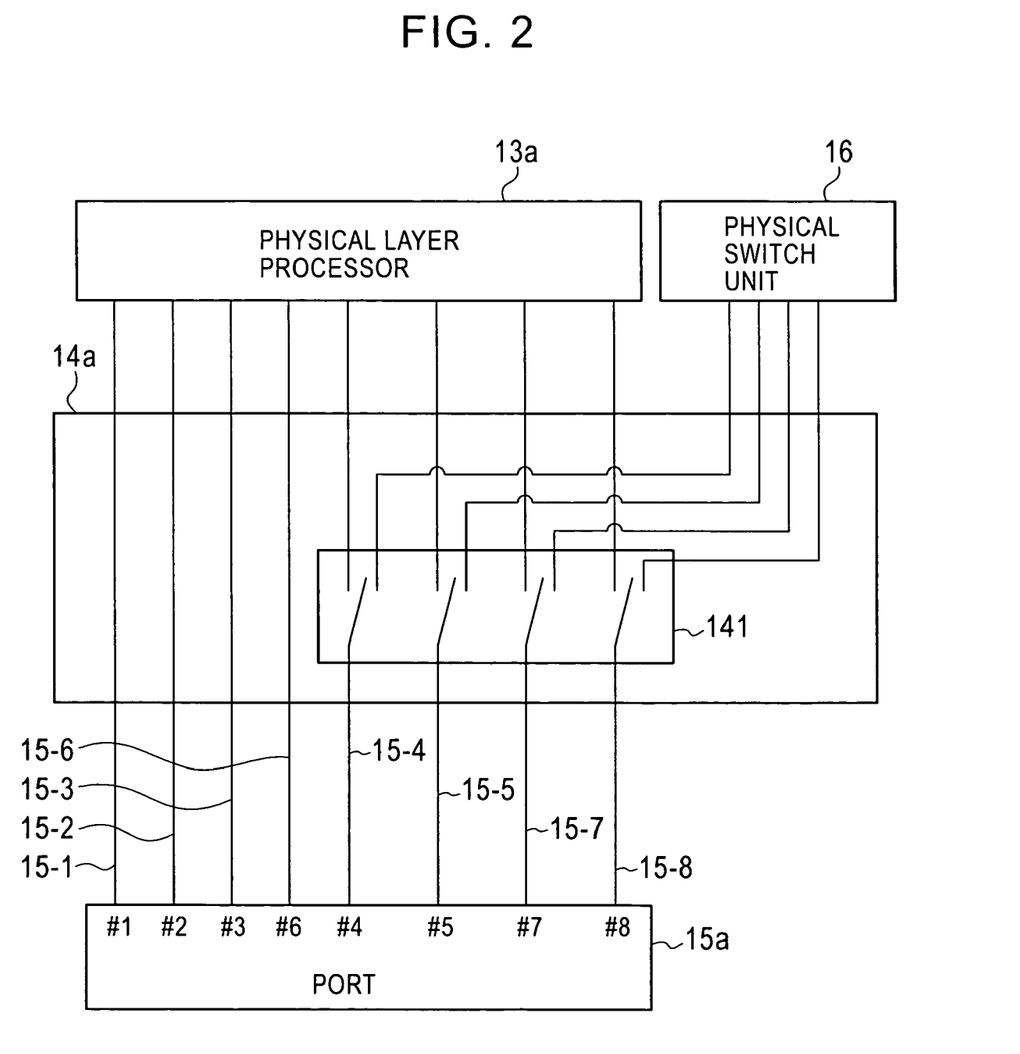
FIG. 2 is a block diagram of a changeover switch in the network system shown in FIG. 1.

Referring to FIG. 2, the configuration of the changeover switch 14a will be described. The changeover switch 14a is connected to the port 15a and the physical layer processor 13a through eight signal lines. The changeover switch 14a is also connected to the physical switch unit 16 through four signal lines. Signal lines 15-1, 15-2, 15-3, and 15-6 corresponding to pins #1, #2, #3, and #6 (i.e., signal lines that are used for packet transmission when performing communication through 10Base-T and 100Base-TX) among the 8 signal lines connected to the port 15a are connected to the physical layer processor 13a. Signal lines 15-4, 15-5, 15-7, and 15-8 corresponding to pins #4, #5, #7, and #8 (i.e., signal lines that are not used for packet transmission when performing communication through 10Base-T and 100Base-TX), which are hereinafter referred to as "unused signal lines," are connected to a switch part 141 included in the changeover switch 14a. Switching between connection destinations of the unused signal lines is performed through the switch part 141. The connection destination of the unused signal lines is either the physical layer processor 13a or the physical switch unit 16. The changeover switch 14a performs switching between the connection destinations of the unused signal lines in response to a switching signal supplied from the controller 11. When the switching signal indicates "1000Base-T," the changeover switch 14a sets the connection destination of the unused signal line(s) to the physical layer processor 13a. When the switching signal indicates a standard other than 1000Base-T, the changeover switch 14a sets the connection destination of the unused signal line(s) to the physical switch unit 16. It should be noted that the configuration of each of other changeover switches 14b to 14d is identical to that of the changeover switch 14a.

Figure 3:
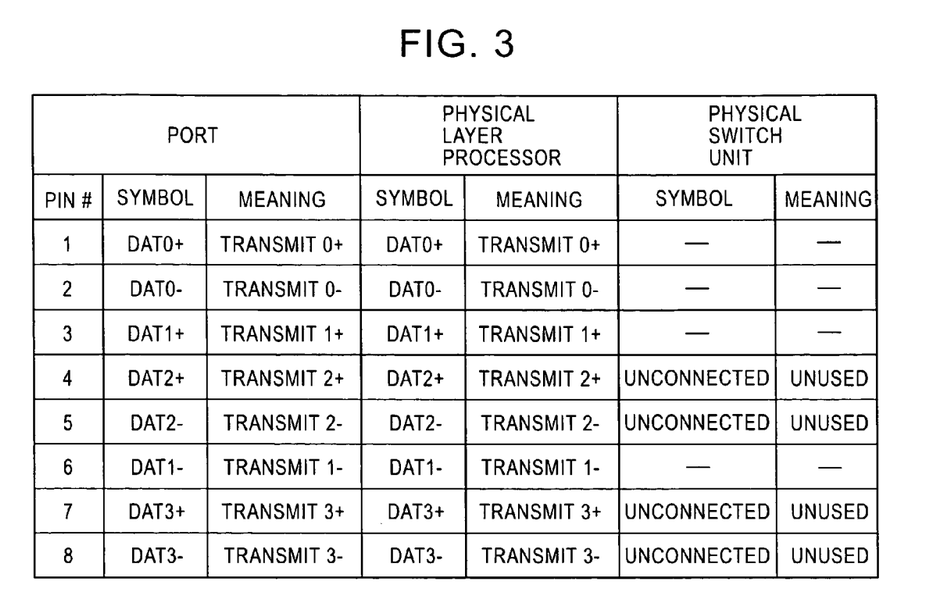
FIG. 3 illustrates a map indicating connection destinations of signal lines of a switch device in the network system shown in FIG. 1.
Figure 4:
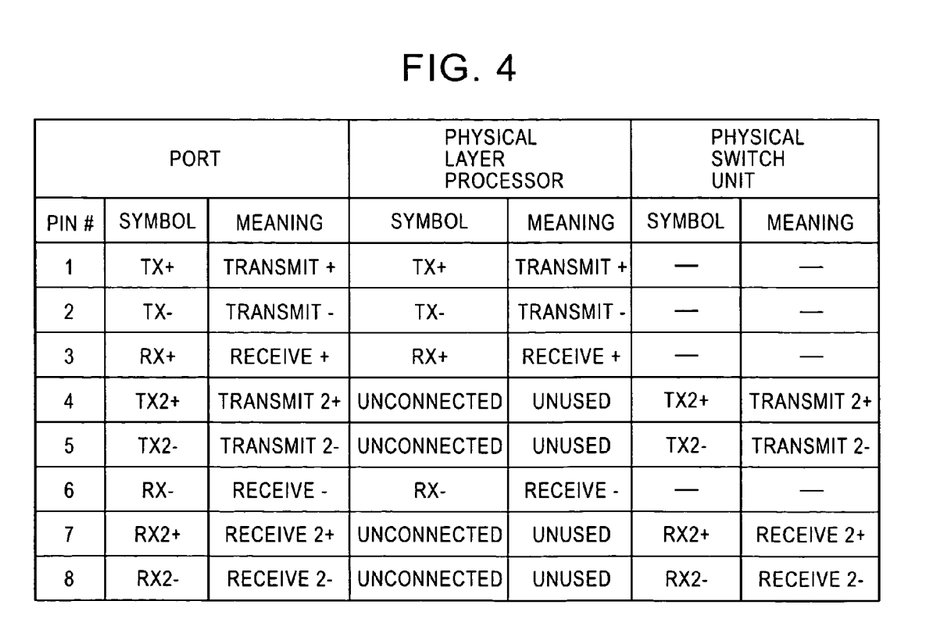
FIG. 4 illustrates another map indicating connection destinations of signal lines of the switch device in the network system shown in FIG. 1.

FIG. 3 illustrates a map indicating connection destinations of the signal lines connected to the ports 15a to 15d when the switching signal indicates "1000Base-T." When the switching signal indicates "1000Base-T," the signal lines connected to the ports 15a to 15d are connected to the physical layer processors 13a to 13d, respectively. FIG. 4 illustrates a map indicating connection destinations of the signal lines connected to the ports 15a to 15d when the switching signal indicates a standard other than 1000Base-T. When the switching signal indicates a standard other than 1000Base-T, the signal lines corresponding to the pins #1, #2, #3, and #6 are connected to the physical layer processors 13a to 13d, while the signal lines corresponding to the pins #4, #5, #7, and #8 are connected to the physical switch unit 16. By setting the connection destinations of the signal lines connected to the ports 15a to 15d according to the map shown in FIG. 4, the connection destinations of those signal lines that are used for packet transmission can be set to the physical layer processors 13a to 13d and the connection destinations of those signal lines that are not used for packet transmission can be set to the physical switch unit 16.

Figure 5:
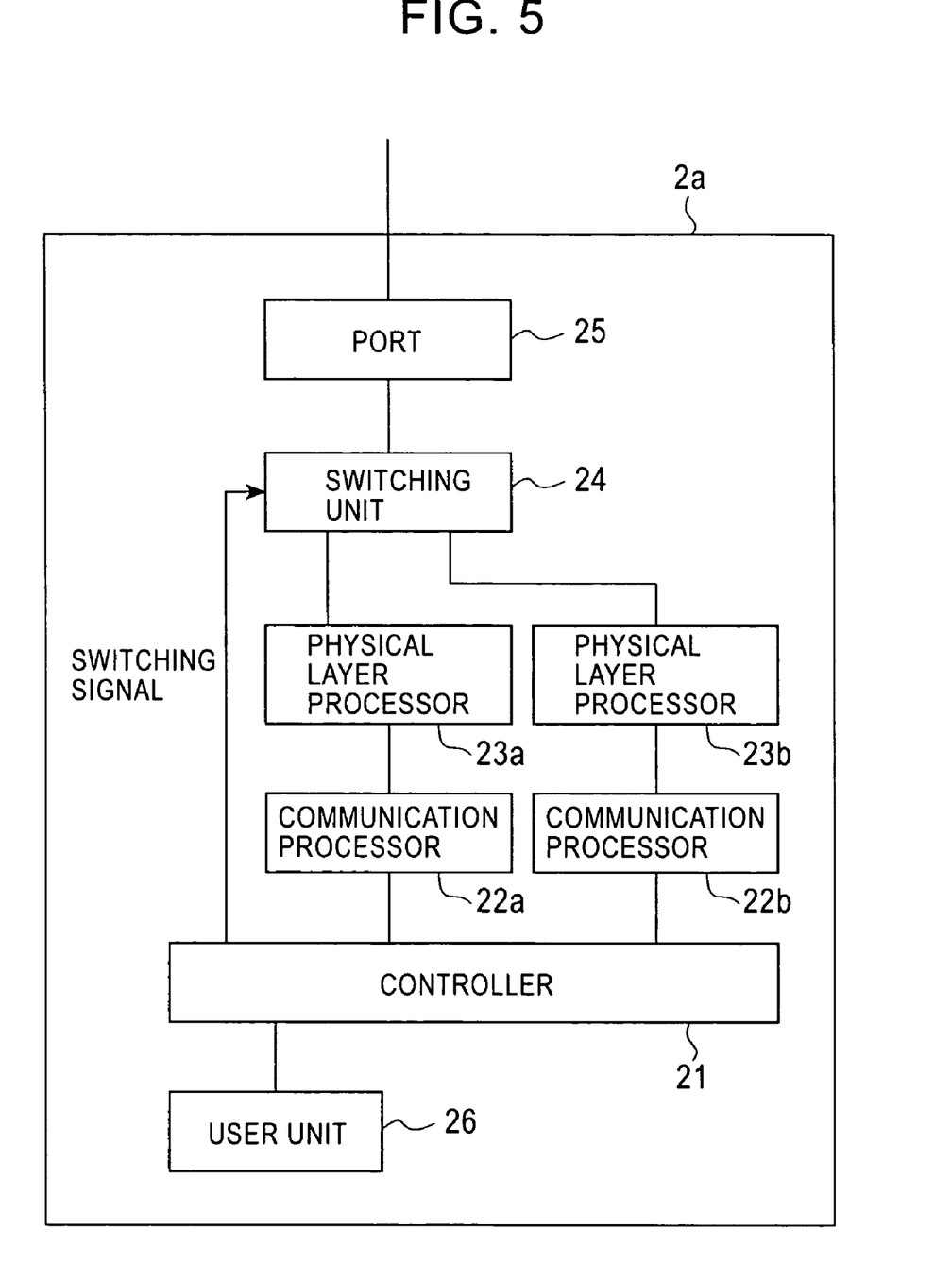
FIG. 5 is a block diagram of a communication terminal in the network system of FIG. 1.

FIG. 5 shows the configuration of the communication terminal 2a. The communication terminal 2a is connected to the port 15a of the switch device 1 through the transmission cable 3a, and transmits and receives packets. The communication terminal 2a includes a controller 21, communication processors 22a and 22b, physical layer processors 23a and 23b, a switching unit 24, a port 25, and a user unit (device that is operated by a user) 26. The controller 21 controls the communication terminal 2a. The controller 21 receives information about a communication speed, communication direction, and the like determined by auto-negotiation from the physical layer processor 23a and controls the communication speed, communication direction, and the like. The controller 21 transmits a switching signal to control the switching unit 24. The communication processors 22a and 22b transmit and receive packets. The communication processor 22a is always used. The communication processor 22b is used only when a command is received from the controller 21. The physical layer processor 23a provides 10Base-T, 100Base-TX, and 1000Base-T interfaces and performs physical layer processing. The physical layer processor 23a also transmits the information about the communication speed, communication direction, and the like determined by auto-negotiation to the controller 21. The physical layer processor 23b provides 10Base-T and 100Base-TX interfaces and performs physical layer processing. The switching unit 24 performs switching between connection destinations of 8 signal lines connected to the port 25 according to a switching signal from the controller 21. The port 25 is a connector receiving 8 signal lines. The port 25 is connected to the port 15a of the switch device 1 through the transmission cable 3a having 8 signal lines. The operating unit 26 receives a user input (command, data, etc.) entered by an operator who operates the communication terminal 2a. The operating unit 26 includes a switch used by a user (operator) to input a signal that enables or disables communication through the unused signal line(s). When this switch is set to enable communication through the unused signal line(s), the operating unit 26 sends a signal indicating that the communication using the unused signal line(s) is enabled, to the controller 21. When this switch is set to disable communication using unused signal line(s), the operating unit 26 sends a signal indicating that communication using unused signal line(s) is disabled, to the controller 21.

Figure 6:
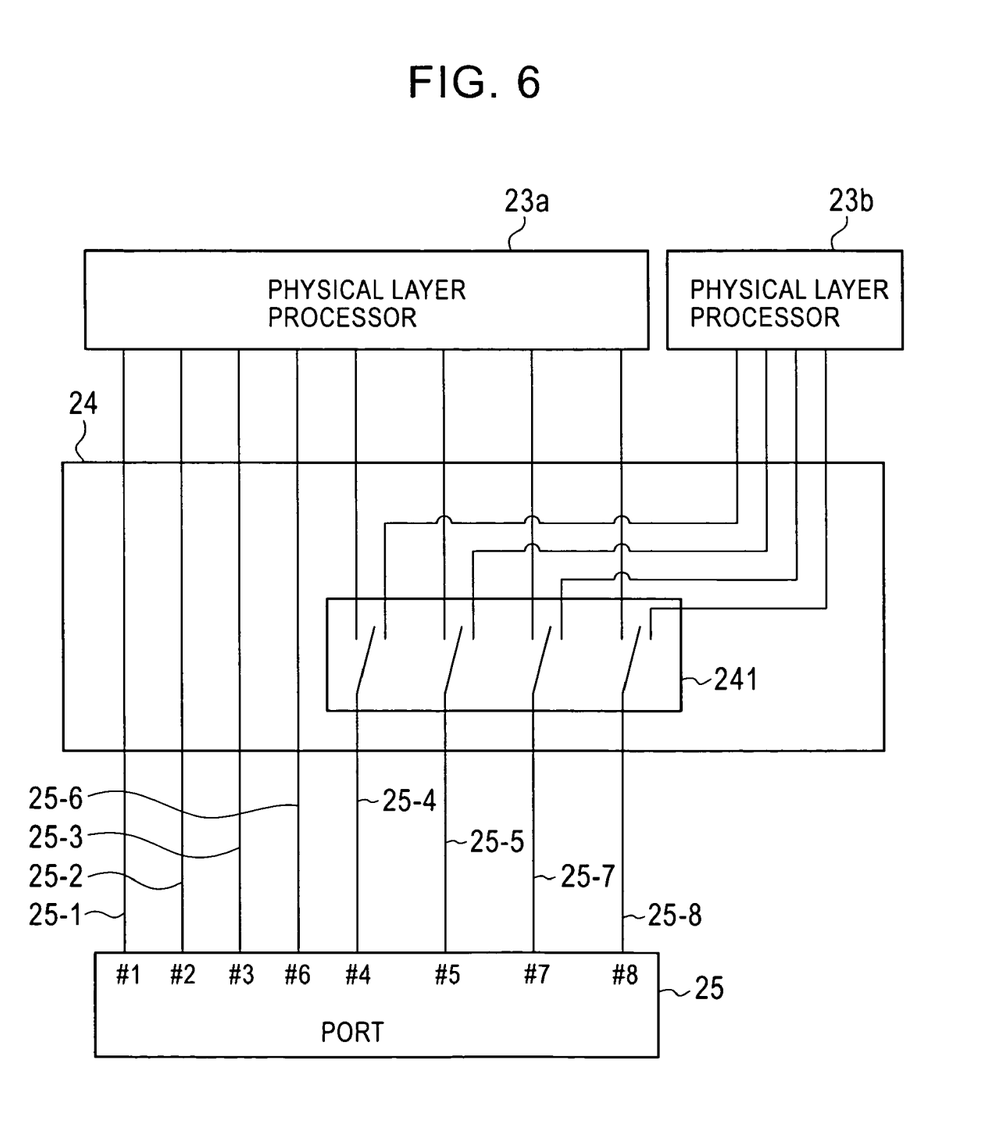
FIG. 6 is a block diagram of a switching unit in the network system of FIG. 1.

FIG. 6 illustrates the configuration of the switching unit 24. The switching unit 24 is connected to the port 25 and the physical layer processor 23a through eight signal lines. The switching unit 24 is also connected to the physical layer processor 23b through four signal lines. Signal lines 25-1, 25-2, 25-3, and 25-6 corresponding to pins #1, #2, #3, and #6 (i.e., signal lines that are used for packet transmission when performing communication through 10Base-T and 100Base-TX) among the 8 signal lines connected to the port 25 are connected to the physical layer processor 23a. Signal lines 25-4, 25-5, 25-7, and 25-8 corresponding to pins #4, #5, #7, and #8 (i.e., signal lines that are not used for packet transmission when performing communication through 10Base-T and 100Base-TX), which are hereinafter referred to as "unused signal lines," are connected to a switch part 241 included in the switching unit 24. Switching between connection destinations of the unused signal lines is performed through the switch part 241. The connection destination of the unused signal lines is either the physical layer processor 23a or the physical layer processor 23b. The switching unit 24 performs switching between the connection destinations of the unused signal lines according to a switching signal from sent the controller 21. When the switching signal indicates that the communication processor 22b is enabled, the switching unit 24 sets the connection destination of the unused signal lines to the physical layer processor 23b. When the switching signal indicates that the communication processor 22b is disabled, the switching unit 24 sets the connection destination of the unused signal lines to the physical layer processor 23a.

Figure 7:
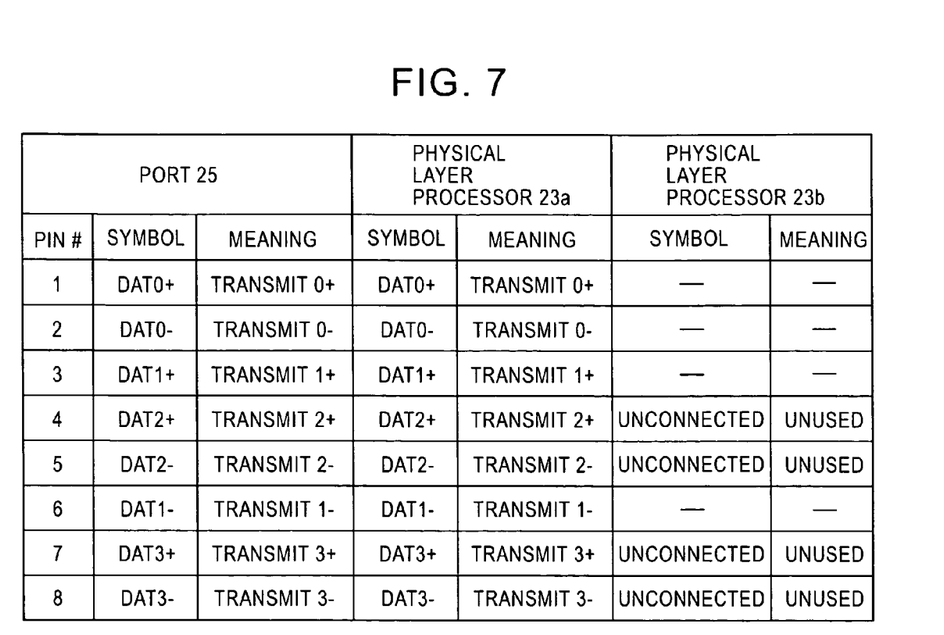
FIG. 7 illustrates a map indicating connection destinations of signal lines of a communication terminal in the network system of FIG. 1.
Figure 8:
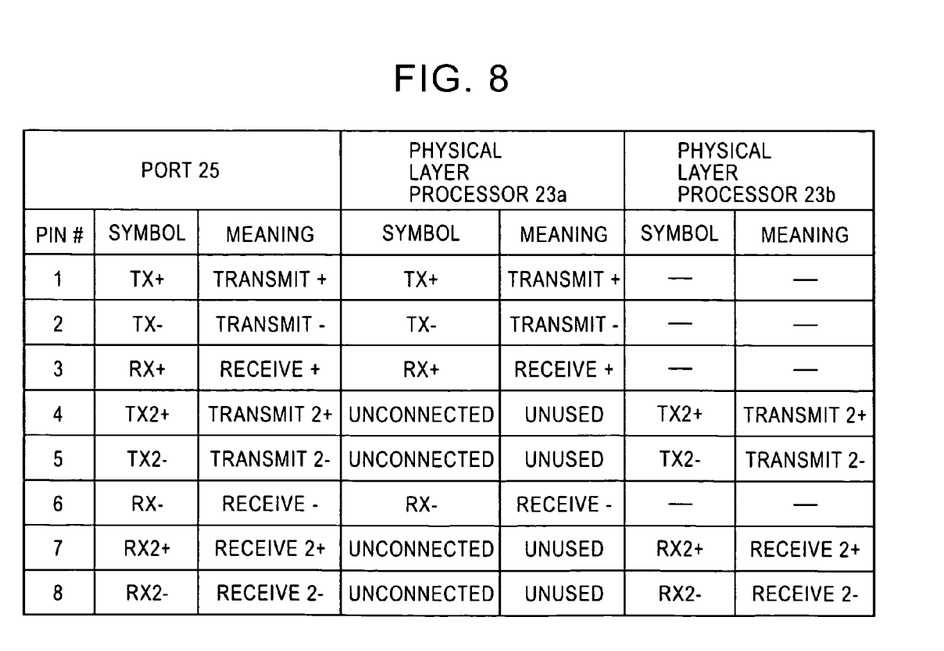
FIG. 8 illustrates another map indicating connection destinations of signal lines of the communication terminal in the network system of FIG. 1.

FIG. 7 illustrates a map indicating connection destinations of signal lines connected to the port 25 when the switching signal indicates that the communication processor 22b is disabled. When the switching signal indicates that the communication processor 22b is disabled, the signal lines connected to the port 25 are connected to the physical layer processor 23a. FIG. 8 illustrates a map indicating connection destinations of signal lines connected to the port 25 when the switching signal indicates that the communication processor 22b is enabled. When the switching signal indicates that the communication processor 22b is enabled, the signal lines corresponding to the pins #1, #2, #3, and #6 are connected to the physical layer processor 23a, while the signal lines corresponding to the pins #4, #5, #7, and #8 are connected to the physical layer processor 23b. By setting (deciding) the connection destinations of the signal lines connected to the port 25 according to the map shown in FIG. 8, the connection destinations of those signal lines that are used for packet transmission can be set to the physical layer processor 23a and the connection destinations of those signal lines that are not used for packet transmission can be set to the physical layer processor 23b.

Figure 9:
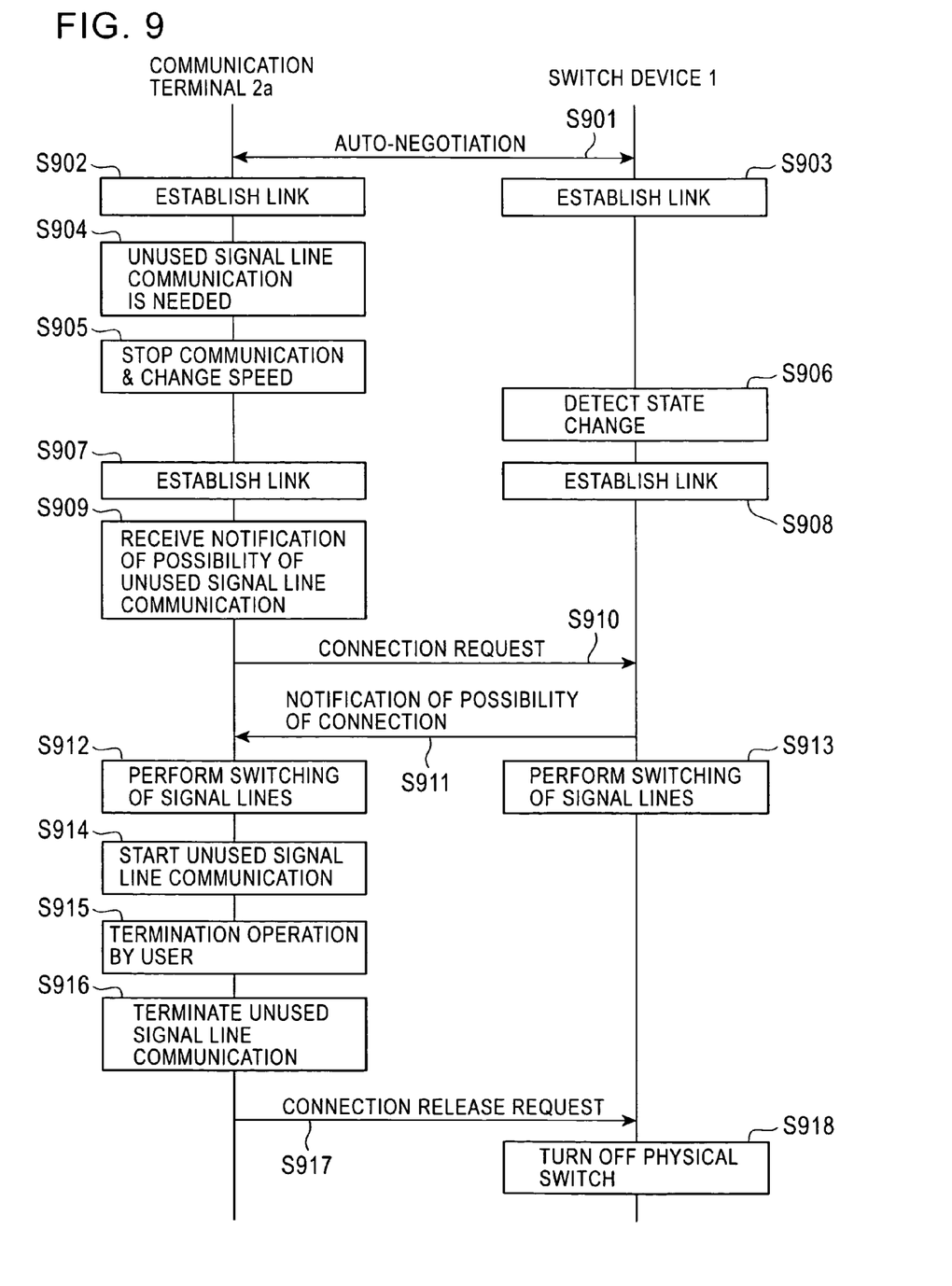
FIG. 9 is a sequence diagram illustrating operation of the network system of FIG. 1.

FIG. 9 illustrates operation of the network system when the communication terminal 2a is connected to the port 15a of the switch device 1.

When the communication terminal 2a is connected to the port 15a of the switch device 1, a communication speed, communication direction, and the like are determined through auto-negotiation between the switch device 1 and the communication terminal 2a (step S901). Here, the switch device 1 transmits a notification of the possibility of unused signal line communication to the communication terminal 2a. The notification of the possibility of unused signal line communication indicates that the switch device 1 includes the switching unit 14 and the physical switch unit 16. After the auto-negotiation, the communication terminal 2a and the switch device 1 establish a link therebetween (step S902 and step S903). After the link is established, the communication terminal 2a checks whether or not there is a need to perform communication using unused signal lines. Here, it is assumed that the switch of the operating unit 26 has been set to enable communication using unused signal lines and therefore there is a need to perform communication using the unused signal lines (step S904). In this case, the communication terminal 2a stops communication and changes the communication speed, communication direction, and the like to those of 100Base-TX or 10Base-T (step S905). When the communication terminal 2a has changed the communication speed, communication direction, and the like, the switch device 1 detects (confirms) that the communication state has been changed (step S906). Then, the communication terminal 2a and the switch device 1 establish a link therebetween (step S907 and step S908).

After the link is established, the communication terminal 2a checks whether or not the notification of the possibility of unused signal line communication has been received from the switch device 1. Here, it is assumed that the notification of the possibility of unused signal line communication has been received (step S909). In this case, the communication terminal 2a transmits a connection request to the switch device 1 (step S910). Upon receiving the connection request, the switch device 1 checks and confirms that packet transmission is not being performed through a port corresponding to connection destination information included in the received connection request and sends a notification of "connection possible" to the communication terminal 2a (step S911).

Upon receiving the "connection possible" notification, the communication terminal 2*a* switches the connection destination of the unused signal lines of the port 25 to the physical layer processor 23*b* (step S912). In the meantime, after transmitting the "connection possible" notification, the switch device 1 switches the connection destinations of the unused signal lines of the ports 15*a* to 15*d* to the physical switch unit 16 and turns on a switch within the physical switch unit 16 which connects the port 15*a* to the port corresponding to the connection destination information (step S913). This causes the unused signal lines of the port 15*a* to be connected to signal lines of the port corresponding to the connection destination information. After switching the connection destinations of the unused signal lines, the communication terminal 2*a* starts communication through the unused signal lines (step S914). In the case where communication using the unused signal lines is performed, a 100Base-TX or 10Base-T signal is allocated to four signal lines, namely the unused signal lines, to perform communication.

Here, it is assumed that the operator of the communication terminal 2*a* has performed an operation (e.g., pushes a button) for terminating communication using the unused signal lines (step S915). In this case, the communication terminal 2*a* terminates communication using the unused signal lines (step S916). The communication terminal 2*a* then transmits a connection release request (i.e., disconnection request) to the switch device 1 (step S917). Upon receiving the connection release request, the switch device 1 turns off the switch in the physical switch unit 16 which is currently connecting the port 15*a* to the port corresponding to the connection destination information (step S918).

As described above, the communication terminal stops the communication and changes the communication speed, communication direction, and the like to those of 100Base-TX or 10Base-T, and then reestablishes the linking and transmits a connection request to the switch device 1. In response to the connection request, the switch device 1 determines whether or not connection to a port corresponding to connection destination information included in the connection request is possible (admissible). If it is determined that the connection to the port is possible, the switch device 1 connects those signal lines, which are not being used for packet transmission among signal lines of a port connected to the communication terminal which has sent the connection request, to signal lines of the port corresponding to the connection destination information. Accordingly, it is possible to perform communication using the signal lines that are not being used for packet transmission while maintaining communication that is being performed before sending the connection request. In addition, it is possible to provide bandwidth guarantee and to prevent packet loss at the switch device 1 since the signal lines used for the unused signal line communication are connected to the signal lines of the port corresponding to the connection destination information through the physical switch unit 16.

Figure 10:
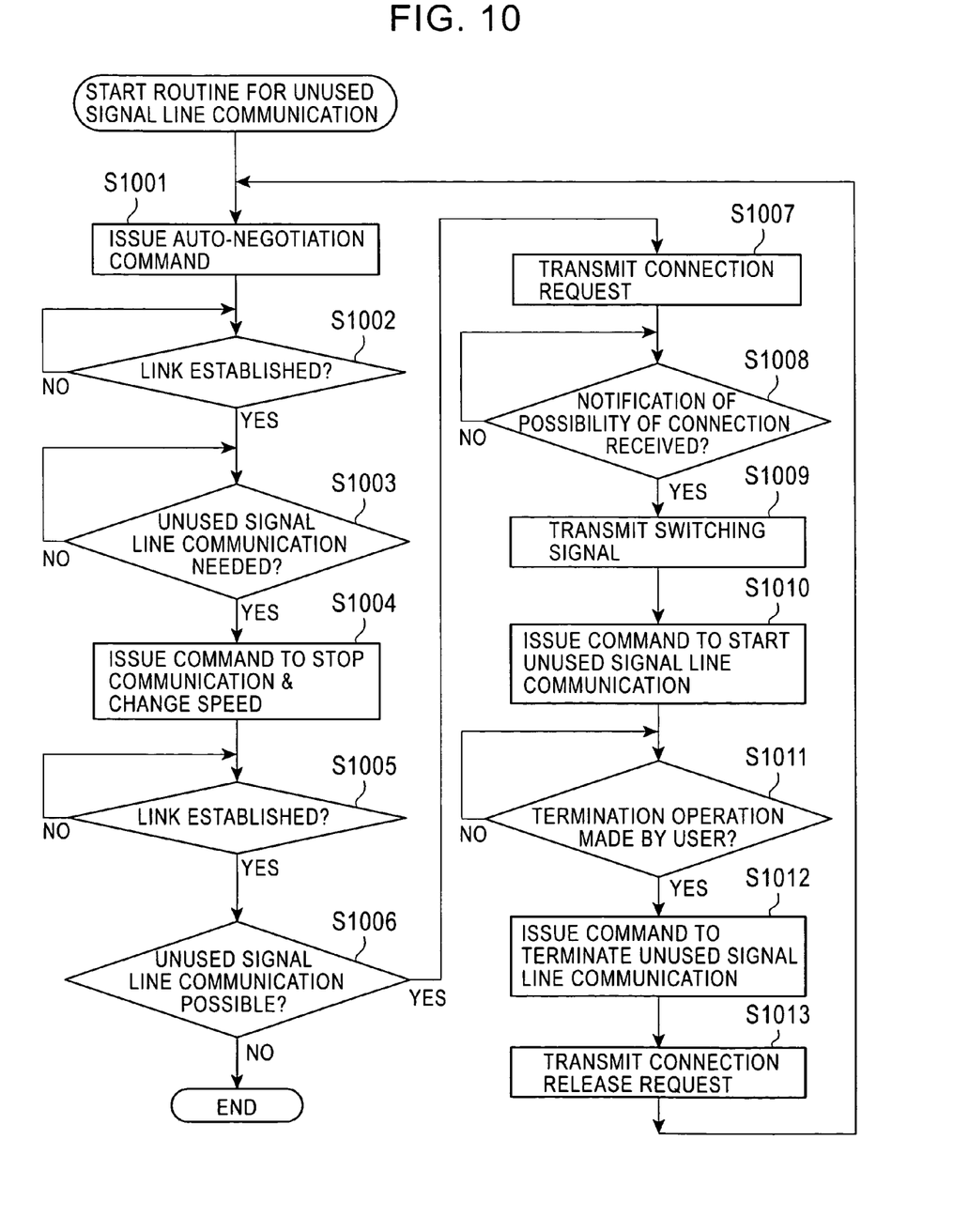
FIG. 10 is a flow chart illustrating how a start routine for unused signal line communication is performed in the network system of FIG. 1.

FIG. 10 illustrates how a start routine for unused signal line communication is performed at the controller 21 of the communication terminal 2*a*. The start routine for unused signal line communication is performed when the communication terminal 2*a* is connected to the switch device 1.

The controller 21 issues a command to the physical layer processor 23*a* to decide a communication speed, communication direction, and the like for communication with the switch device 1 through auto-negotiation. (step S1001). Upon receiving the command from the controller 21, the physical layer processor 23*a* determines a communication speed, communication direction, and the like for communication with the switch device 1 through auto-negotiation. The information about the determined communication speed, communication direction, and the like is transmitted from the physical layer processor 23*a* to the controller 21. After auto-negotiation, the controller 21 determines whether or not a link has been established with the switch device 1 (step S1002). When no link is established, the controller 21 waits until a link is established.

When a link is established with the switch device 1, the controller 21 determines whether or not there is a need to perform communication using unused signal lines (step S1003). When a signal indicating that communication using unused signal lines should be done has been transmitted from the operating unit 26, the controller 21 determines that there is a need to perform communication using unused signal lines. On the other hand, when a signal indicating that communication using unused signal lines should not be done has been transmitted from the operating unit 26, the controller 21 determines that there is no need to perform communication using unused signal lines. When it is determined that there is no need to perform communication using unused signal lines, the controller 21 waits until there is a need to perform communication using unused signal lines. On the other hand, when it is determined that there is a need to perform communication using unused signal lines, the controller 21 issues a command to the physical layer processor 23*a* to stop communication and to change the current communication speed, communication direction, and the like to those of 100Base-TX or 10Base-T (step S1004). Upon receiving the command from the controller 21, the physical layer processor 23*a* stops the communication and updates the communication speed, communication direction, and the like with those of 100Base-TX or 10Base-T. After the communication speed, communication direction, and the like are updated, the controller 21 determines whether or not a link has been established with the switch device 1 (step S1005). When no link has been established, the controller 21 waits until a link is established.

When a link is established with the switch device 1, the controller 21 checks whether or not a notification of the possibility of unused signal line communication has been received from the switch device 1 (step S1006). When a notification of the possibility of unused signal line communication has not been received, the controller 21 terminates the procedure. When a notification of the possibility of unused signal line communication has been received, the controller 21 transmits a connection request to the switch device 1 (step S1007). An IP address of a communication terminal, which is a connection destination, is written as connection destination information in the connection request. After transmitting the connection request, the controller 21 checks whether or not a notification of "connection possibl3" has been received from the switch device 1 (step S1008). When a connection-possible notification has not been received, the controller 21 waits until the connection-possible notification is received. When a connection-possible notification has been received, the controller 21 transmits a switching signal indicating that the communication processor 22*b* is enabled to the switching unit 24 (step S1009). Upon receiving the switching signal indicating that the communication processor 22*b* is enabled, the switching unit 24 switches the connection destination of the unused signal lines of the port 25 to the physical layer processor 23*b*. After transmitting the switching signal, the controller 21 issues a command to the communication processor 22*b* to start communication using unused signal lines (step S1010). Upon receiving the command from the controller 21, the communication processor 22*b* starts communication using the unused signal lines of the port 25.

After issuing the command to the communication processor 22b, the controller 21 checks whether or not an operation for terminating the communication using unused signal lines has been performed (step S1011). When an operation for terminating the communication using unused signal lines has not been performed, the controller 21 waits until the operation is performed. When an operation for terminating the communication using unused signal lines has been performed, the controller 21 issues a command to the communication processor 22b to terminate the communication using unused signal lines (step S1012). Upon receiving the command from the controller 21, the communication processor 22b terminates the communication using the unused signal lines of the port 25. After issuing the command to the communication processor 22b, the controller 21 transmits a connection release request to the switch device 1 (step S1013).

Figure 11:
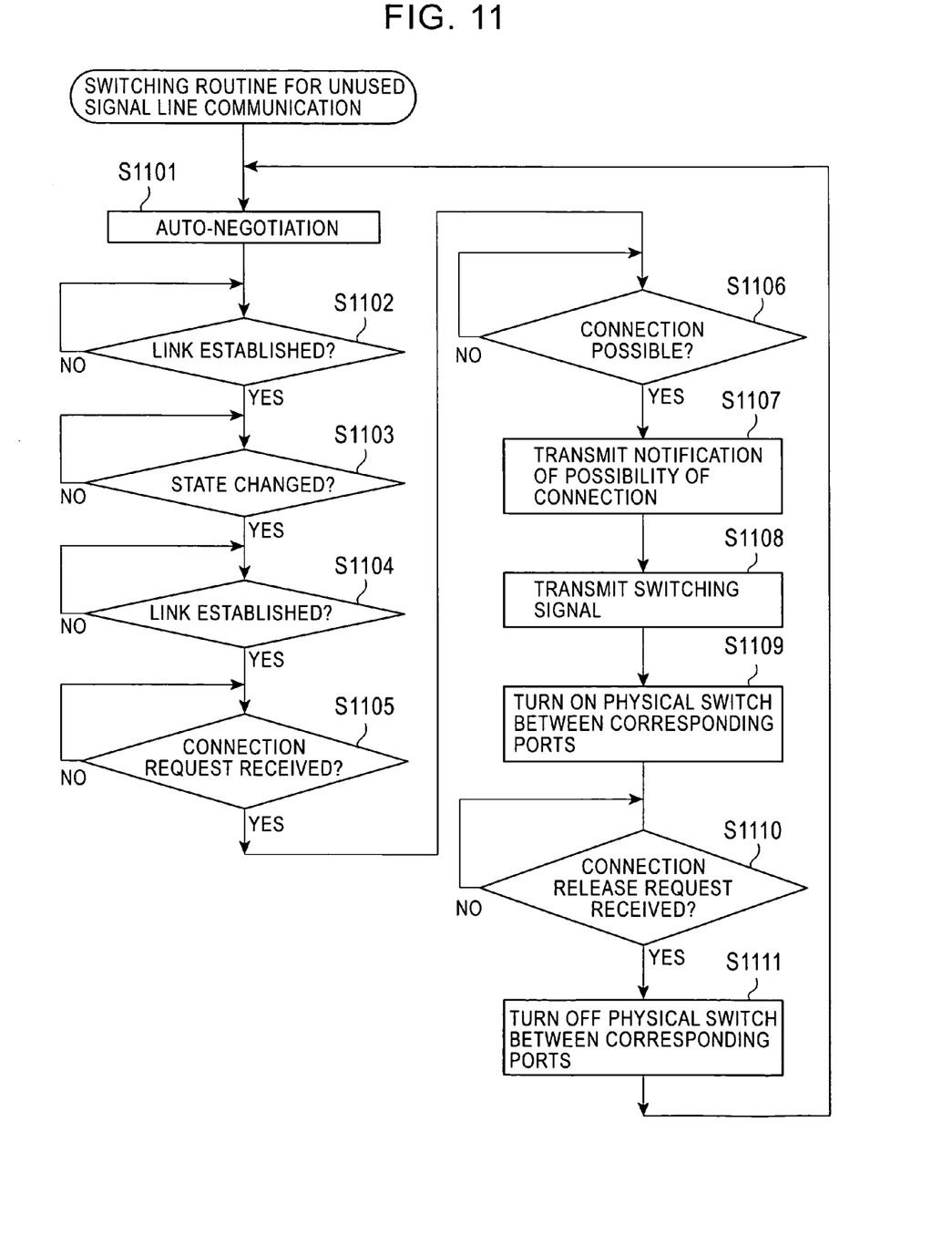
FIG. 11 is a flow chart illustrating how a switching routine for unused signal line communication is performed in the network system of FIG. 1.

FIG. 11 illustrates how a switching routine for unused signal line communication is performed at the controller 11 of the switch device 1. The switching routine for unused signal line communication is performed when one of the communication terminals 2a to 2d is connected to the switch device 1.

The controller 11 issues a command to a physical layer processor, which corresponds to a switch device port connected to the communication terminal, to determine a communication speed, communication direction, and the like for communication with the communication terminal through auto-negotiation (step S1101). Upon receiving the command from the controller 11, the physical layer processor determines a communication speed, communication direction, and the like for communication with the communication terminal 2 through auto-negotiation. The information about the determined communication speed, communication direction, and the like is transmitted from the physical layer processor to the controller 11. The controller 11 sends a notification of the possibility of unused signal line communication to the communication terminal. The notification of the possibility of unused signal line communication indicates that the switch device 1 includes the switching unit 14 and the physical switch unit 16. After auto-negotiation, the controller 11 determines whether or not a link has been established with the communication terminal (step S1102). When no link has been established, the controller 11 waits until a link is established.

When a link has been established with the communication terminal, the controller 11 determines whether or not a change has been made to the state of communication with the communication terminal (step S1103). When no change has been made to the state of communication, the controller 11 waits until a change is made. When a change has been made to the state of communication, the controller 11 determines whether or not a link has been established with the communication terminal (step S1104). When no link has been established, the controller 11 waits until a link is established.

When a link has been established with the communication terminal, the controller 11 checks whether or not a connection request has been received from the communication terminal (step S1105). When no connection request has been received, the controller 11 waits until a connection request is received. When a connection request has been received, the controller 11 determines whether or not it is possible to connect a port corresponding to connection destination information included in the received connection request to the communication terminal which has transmitted the connection request (step S1106). If packet transmission is not being performed through the port corresponding to the connection destination information, the controller 11 determines that the connection of the port corresponding to the connection destination information to the communication terminal is possible. If packet transmission is being performed through the port corresponding to the connection destination information, the controller 11 determines that connection is not possible. If it is determined that connection is not possible, the controller 11 waits until the connection becomes possible. If it is determined that connection is possible, the controller 11 transmits a "connection possible" notification to the communication terminal (step S1107).

After transmitting the "connection possible" notification, the controller 11 transmits a switching signal indicating a standard other than 1000Base-T to the switching unit 14 (step S1108). Upon receiving the switching signal indicating a standard other than 1000Base-T, the switching unit 14 switches the connection destination of the unused signal lines of the ports 15a to 15d to the physical switch unit 16. After transmitting the switching signal, the controller 11 transmits a physical switch control signal to the physical switch unit 16 to turn on a switch which connects the port connected to the connection-request-making communication terminal to the port corresponding to the connection destination information (step S1109). Upon receiving the physical switch control signal, the physical switch unit 16 turns on the switch which connects the port connected to the connection-request-making communication terminal to the port corresponding to the connection destination information.

After transmitting the physical switch control signal, the controller 11 checks whether or not a connection release request has been received from the communication terminal (step S1110). If no connection release request has been received, the controller 11 waits until a connection release request is received. If a connection release request has been received, the controller 11 transmits a physical switch control signal to the physical switch unit 16 to turn off the switch which was turned on at the process of S1109 (step S1111). Upon receiving the physical switch control signal, the physical switch unit 16 turns off the switch.

As is apparent from the above description, the present invention provides a network system with a variety of features and advantages. For example, in response to a connection request from a communication terminal, the switch device determines whether or not connection to a port corresponding to connection destination information included in the connection request is possible. If connection to the port is possible, the switch device connects signal lines, which are not being used for packet transmission among signal lines of a port connected to the connection-request-making communication terminal, to signal lines of the port corresponding to the connection destination information. The connection-request-making communication terminal performs communication using the signal lines which are not being used for packet transmission. Accordingly, it is possible to perform communication using the signal lines (unused signal lines) that are not being used for packet transmission while continuing (maintaining) communication that is already started before the connection request is made. In addition, it is possible to provide bandwidth guarantee and to prevent packet loss at the switch device since the signal lines used for the unused signal line communication are connected to the signal lines of the port corresponding to the connection destination information.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

This application is based on Japanese Patent Application No. 2007-263168 filed on Oct. 9, 2007 and the entire disclosure thereof is incorporated herein by reference.

What is claimed is:

1. A network system comprising:

a switch device including a plurality of ports having at least first and second ports, for receiving a packet at the first port thereof and transmitting the packet from the second port thereof, the second port corresponding to a destination of the packet;

a plurality of communication terminals that are connected to the plurality of ports of the switch device, respectively, to transmit and receive packets between the plurality of communication terminals through the switch device; and a plurality of signal line groups for connecting said plurality of communication terminals to said plurality of ports of said switch device, respectively, each said signal line group having a plurality of signal lines, with said packet being transmitted through one of the signal lines in each said signal line group;

each said communication terminal including:

a connection request unit that transmits a connection request, which carries information about the destination of the packet, to the switch device; and an unused signal line communication unit that performs communication using a signal line that is not being used for packet transmission when a connection-possible notification is received from the switch device, the switch device including:

a connection determination unit that determines, upon receiving the connection request, whether or not connection to the second port is possible;

a connection possibility notifier that transmits, when the connection determination unit determines that the connection to the second port is possible, the connection-possible notification to the connection-request-transmitting communication terminal; and an unused signal line connecting unit that connects, when the connection determination unit determines that the connection to the second port is possible, a signal line, which is not being used for packet transmission among the signal lines of said port connected to the connection-request-transmitting communication terminal, to a signal line of the second port.

2. The network system according to claim 1, wherein the connection determination unit determines that the connection to the second port is possible when packet transmission is not being performed through the second port.

3. The network system according to claim 1, wherein the communication terminal further includes an input unit used to enter a signal to enable or disable communication using signal lines that are not being used for packet transmission, and the connection request unit transmits the connection request when a signal to enable communication using signal lines that are not being used for packet transmission is entered through the input unit.

4. The network system according to claim 1, wherein the switch device further includes an unused signal line communication possibility notifier that transmits a notice of possibility of unused signal line communication to each of the communication terminals, the notice indicating that the switch device includes the unused signal line connection unit, and the connection request unit transmits the connection request when the notice of possibility of unused signal line communication is received.

5. A communication terminal for use in a network system, which includes a switch device having a first port connected thereto through a plurality of first signal lines, and a second port connected thereto through a plurality of second signal lines, the switch device receiving a packet from said communication terminal at the first port and transmitting the packet to a destination of the packet from the second port, the second port being connected to the destination of the packet through at least one of the plurality of second signal lines, the communication terminal comprising:

a connection request unit that transmits a connection request to the switch device, said connection request carrying information about the destination of the packet;

an unused signal line communication unit that communicates via an unused signal line, among said plurality of first signal lines, that is not being used for another packet transmission, when a connection-possible notification is received from the switch device; and an input unit for entering an enable signal to enable the communication via the unused signal line, and wherein the connection request unit transmits the connection request to the switch device when the enable signal is entered through the input unit.

6. A switch device for use in a network system, said network system including a first communication terminal and a second communication terminal that are connected to the switch device to send a packet from the first communication terminal to the second communication terminal via the switch device, with a plurality of first signal lines extending between the first communication terminal and the switch device, and at least one second signal line extending between the switch device and the second communication terminal, said switch device comprising:

a first port to receive the packet from the first communication terminal through one of said first signal lines;

a second port to transmit the packet to the second communication terminal through said at least one second signal line;

a connection determination unit that determines, upon receiving a connection request from the first communication terminal, whether or not connection to the second port is possible;

a connection possibility notifier that transmits, when the connection determination unit determines that the connection to the second port is possible, the connection-possible notification to the first communication terminal; and an unused signal line connecting unit that connects, when the connection determination unit determines that the connection to the second port is possible, a signal line, which is not being used for another packet transmission among the first signal lines, to said second signal line.

7. The switch device according to claim 6, wherein the connection determination unit determines that the connection to the second port is possible when another packet transmission is not being performed through the second port.

* * * * *